US009041232B2

(12) United States Patent
Shah et al.

(10) Patent No.: US 9,041,232 B2
(45) Date of Patent: May 26, 2015

(54) ELECTRIC GENERATOR SYSTEM

(71) Applicant: General Electric Company, Schenectady, NY (US)

(72) Inventors: Manoj Ramprasad Shah, Niskayuna, NY (US); Tsarafidy Raminosoa, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 32 days.

(21) Appl. No.: 14/052,136

(22) Filed: Oct. 11, 2013

(65) Prior Publication Data

US 2015/0102606 A1 Apr. 16, 2015

(51) Int. Cl.
*F02B 63/04* (2006.01)
*H02K 7/18* (2006.01)
*H02K 7/20* (2006.01)
*F02N 11/04* (2006.01)

(52) U.S. Cl.
CPC ............... *H02K 7/20* (2013.01); *H02K 7/1807* (2013.01)

(58) Field of Classification Search
USPC .................................................. 290/1 A, 31
See application file for complete search history.

(56) References Cited

U.S. PATENT DOCUMENTS

| 3,573,578 | A | * | 4/1971 | Shibata ........................ 318/720 |
| 3,904,901 | A | * | 9/1975 | Renard et al. .................. 310/52 |
| 4,058,746 | A | * | 11/1977 | Mole et al. ..................... 310/10 |
| 4,093,869 | A | * | 6/1978 | Hoffmann et al. .............. 290/31 |
| 4,176,292 | A | * | 11/1979 | Kalsi et al. ...................... 310/52 |
| 4,316,112 | A | * | 2/1982 | Waldron et al. ......... 310/216.109 |
| 4,316,113 | A | * | 2/1982 | Sato et al. ..................... 310/262 |
| 5,493,201 | A |   | 2/1996 | Baker ............................. 322/10 |
| 6,888,329 | B2 | * | 5/2005 | Inoue et al. ............... 318/400.02 |
| 7,183,678 | B2 | * | 2/2007 | Sivasubramaniam et al. .. 310/64 |
| 7,378,766 | B2 | * | 5/2008 | Vasilescu et al. ............... 310/58 |
| 7,508,086 | B2 |   | 3/2009 | Huang et al. .................... 290/31 |
| 7,687,928 | B2 |   | 3/2010 | Taneja et al. ................ 290/36 R |
| 7,915,869 | B2 |   | 3/2011 | Xu et al. ......................... 322/59 |

(Continued)

FOREIGN PATENT DOCUMENTS

| GB | 570125 A | 6/1945 |
| GB | 1468883 A | 3/1977 |

OTHER PUBLICATIONS

Zulu, Ackim; Mecrow, Barrie C.; *Member, IEEE*, and Armstrong, Matthew: A Wound-Field Three-Phase Flux-Switching Synchronous Motor With All Excitation Sources on the Stator; IEEE Transactions on Industry Applications, vol. 46, No. 6, Nov./Dec. 2010, pp. 2363-2371.

(Continued)

*Primary Examiner* — Pedro J Cuevas
(74) *Attorney, Agent, or Firm* — John P. Darling

(57) ABSTRACT

An electric generator system includes a rotatable shaft that is configured to rotate about a central longitudinal axis of the shaft, and a pilot permanent magnet generator (PMG) mounted to the shaft such that the pilot PMG is configured to rotate about the central longitudinal axis with the rotatable shaft. The system includes a wound field flux-switching electric machine having a rotor and a stator. The rotor is mounted to the shaft such that the rotor is configured to rotate about the central longitudinal axis with the shaft. The stator includes both a direct current (DC) field coil and an alternating current (AC) armature coil. The DC field coil is operatively connected to the pilot PMG for exciting the DC field coil.

20 Claims, 9 Drawing Sheets

(56) References Cited

U.S. PATENT DOCUMENTS

| | | | |
|---|---|---|---|
| 7,990,115 B2 | 8/2011 | Anghel et al. | 322/61 |
| 8,030,788 B2 | 10/2011 | Xu et al. | 290/31 |
| 8,148,834 B2 | 4/2012 | Huang et al. | 290/31 |
| 8,324,747 B2 | 12/2012 | Anghel et al. | 290/31 |
| 2005/0162025 A1* | 7/2005 | Sivasubramaniam et al. | 310/64 |
| 2005/0162030 A1* | 7/2005 | Shah et al. | 310/165 |
| 2006/0214426 A1* | 9/2006 | Asao et al. | 290/31 |
| 2007/0069593 A1* | 3/2007 | Vasilescu et al. | 310/54 |
| 2012/0286516 A1* | 11/2012 | Chong et al. | 290/52 |
| 2013/0016546 A1 | 1/2013 | Mountain | 363/127 |
| 2013/0140816 A1* | 6/2013 | Kamioka et al. | 290/31 |
| 2013/0257188 A1 | 10/2013 | Raminosoa et al. | 310/46 |
| 2014/0125156 A1* | 5/2014 | Meeker | 310/46 |

OTHER PUBLICATIONS

Combined Search and Examination Report of corresponding GB Application 1417778.6 issued Feb. 27, 2015.

* cited by examiner

ELECTRIC GENERATOR SYSTEM

BACKGROUND

Rotating electric machines are used for a wide variety of applications, such as automotive applications, aerospace applications, marine applications, industrial applications, and/or the like. Rotating electric machines include a rotor and a stator. A rotating electric machine may be an electrical motor, wherein the rotor rotates relative to the stator to convert electrical energy to mechanical energy. Rotating electric machines also include electric generators, wherein the relative rotation between the rotor and the stator converts mechanical energy to electrical energy. One example of an electric generator is an electric generator that is used onboard aircraft, such as, but not limited to, for supplying electrical power to the electrical system of the aircraft.

At least some known electric generator systems include a three-phase wound field synchronous rotating electric machine (i.e., a wound field synchronous generator). A brush-less exciter is operatively connected to the wound field synchronous generator for exciting the field winding. The brush-less exciter includes a controllable stationary direct current (DC) excitation and a three-phase rotating armature connected to a rotating rectifier that supplies the main excitation requirements of the rotating field winding of the wound field synchronous generator. Electrical power is supplied to the brush-less exciter by a pilot permanent magnet generator (PMG).

Known electric generator systems that include wound field synchronous generators are not without disadvantages. For example, the brush-less exciter and rotating rectifier of such electric generator systems may increase the cost and/or decrease the reliability of the system. Moreover, it may be difficult to sufficiently remove heat from the rotating active windings of the rotor of wound field synchronous generators, which may decrease the reliability of the system. Further, because of the rotating rectifier and active windings, wound field synchronous generators may not be suitable for use in relatively harsh environments wherein the wound field synchronous generator is exposed to relatively high temperatures, relatively low temperatures, moisture, chemicals, dust, abrasive materials, shock loading, vibration, and/or the like.

BRIEF DESCRIPTION

In an embodiment, an electric generator system includes a rotatable shaft that is configured to rotate about a central longitudinal axis of the shaft, and a pilot permanent magnet generator (PMG) mounted to the shaft such that the pilot PMG is configured to rotate about the central longitudinal axis with the rotatable shaft. The system includes a wound field flux-switching electric machine having a rotor and a stator. The rotor is mounted to the shaft such that the rotor is configured to rotate about the central longitudinal axis with the shaft. The stator includes both a direct current (DC) field coil and an alternating current (AC) armature coil. The DC field coil is operatively connected to the pilot PMG for exciting the DC field coil.

In an embodiment, an aircraft includes an airframe and an engine on-board the airframe. The engine includes a rotatable shaft that is configured to rotate about a central longitudinal axis of the shaft. An electric generator system is on-board the airframe. The electric generator system includes a pilot permanent magnet generator (PMG) mounted to the shaft of the engine such that the pilot PMG is configured to rotate about the central longitudinal axis with the shaft. The system includes a wound field flux-switching electric machine having a rotor and a stator. The rotor is mounted to the shaft of the engine such that the rotor is configured to rotate about the central longitudinal axis with the shaft. The stator includes both a direct current (DC) field coil and an alternating current (AC) armature coil. The DC field coil is operatively connected to the pilot PMG for exciting the DC field coil.

In an embodiment, an electric generator system includes a rotatable shaft that is configured to rotate about a central longitudinal axis of the shaft, a direct current (DC) source, and a wound field flux-switching electric machine. The electric machine includes a rotor and a stator. The rotor is mounted to the shaft such that the rotor is configured to rotate about the central longitudinal axis with the shaft. The stator includes both a DC field coil and an alternating current (AC) armature coil. The DC field coil is operatively connected to the DC source for exciting the DC field coil.

DETAILED DESCRIPTION

Figure 1:
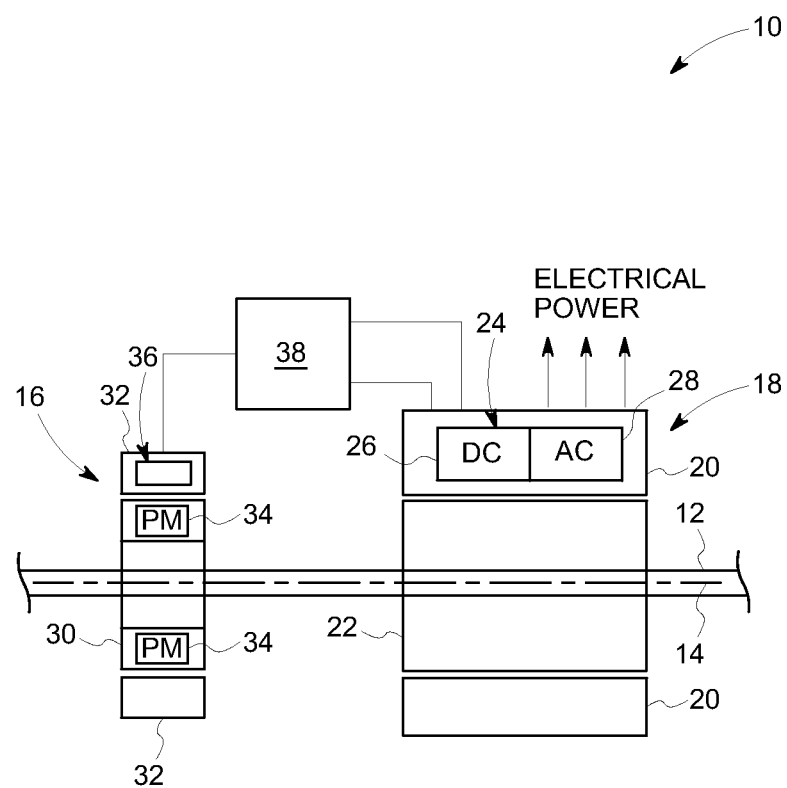
FIG. 1 is a schematic view of an embodiment of an electric generator system.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide electric generator systems that include wound field flux-switching electric machines. At least one technical effect of the various embodiments is the reduction of the number of components of an electric generator system, which may reduce a cost and/or increase a reliability of the electric generator system. For example, the use of a wound field flux-switching electric machine may enable the elimination of a rotating rectifier and/or a brush-less exciter from the electric generator system. At least one technical effect of the various embodiments is an electric generator system that heat is more easily removed from (which may decrease the reliability of the system), for example as compared to known electric generator systems that include wound field synchronous electric machines. At least one technical effect of the various embodiments is an electric generator system that is more suitable for use in environments wherein the electric generator system is exposed to relatively high temperatures, relatively low temperatures, moisture, chemicals, dust, abrasive materials, and/or the like than at least some known electric generator systems that include wound field synchronous electric machines.

As will be described below, the stators of the wound field flux-switching electric machines of the various embodiments include all of the active windings of the wound field flux-switching electric machines. At least one technical effect of such a passive rotor is that the rotor can be made more mechanically robust and therefore more suitable for relatively high speeds, relatively high temperatures, and/or relatively harsh environments, for example as compared to known electric generator systems that include wound field synchronous electric machines. The MTBF of the wound field flux-switching electric machines of the various embodiments may be higher than at least some known electric generator systems because of the elimination of rotating rectifiers, brush-less exciters, and/or active windings on the rotor. At least one technical effect of the various embodiments is the potential to increase the power density of the electrical generator system as the elimination of a brush-less exciter may eliminate a set of end windings. The wound field flux-switching electric machines described and/or illustrated herein can implement modular multiphase and/or multiple three phase channel configurations.

FIG. 1 is a schematic view of an embodiment of an electric generator system 10. The electric generator system 10 may be used to generate electrical power in any application such as, but are not limited to, automotive applications, aerospace applications, marine applications, industrial applications, and/or the like. One non-limiting example of an application for the system 10 is onboard an aircraft (e.g., the aircraft 800 shown in FIG. 11), such as, but not limited to, for supplying electrical power to an electrical system (e.g., the electrical system 803 shown in FIG. 11) of the aircraft, for use as a motor for starting an aircraft engine (e.g., the aircraft engine 804 shown in FIG. 11), and/or the like.

The system 10 includes a rotatable shaft 12 that extends a length along a central longitudinal axis 14. The shaft 12 is configured to rotate about the central longitudinal axis 14. The shaft 12 may be a shaft of another component of a larger system (e.g., an engine, an aircraft, and/or the like) that includes the system 10. For example, the shaft 12 may be an output shaft of an electric motor, a crankshaft of a combustion engine, a shaft of a gas turbine engine, and/or the like.

The system 10 includes a pilot permanent magnet generator (PMG) 16 and a wound field flux-switching electric machine 18. The electric machine 18 includes a stator 20 and a rotor 22. The rotor 22 of the electric machine 18 is mounted to the shaft 12 such that the rotor 22 rotates about the central longitudinal axis 14 with the shaft 12. The electric machine 18 is an electric generator, wherein the relative rotation between the rotor 22 and the stator 20 converts mechanical energy to electrical energy. As will be described in more detail below, the stator 20 of the electric machine 18 includes all of the active windings 24 of the electric machine 18. Specifically, the stator 20 includes both direct current (DC) field coils 26 and alternating current (AC) armature coils 28.

The pilot PMG 16 includes a rotor 30 and a stator 32. In the illustrated embodiment, the rotor 30 includes one or more permanent magnets 34 and the stator 32 includes a one or three phase armature 36. The pilot PMG 16 is mounted to the shaft 12. Specifically, the rotor 30 of the pilot PMG 16 is mounted to the shaft 12 such that the rotor 30 rotates about the central longitudinal axis 14 with the shaft 12. As shown in FIG. 1, pilot PMG 16 is operatively connected to the DC field coils 26 of the electric machine 18 such that the pilot PMG 16 is configured to excite the DC field coils 26. Specifically, the armature 36 of the stator 32 of the pilot PMG 16 is electrically connected to the DC field coils 26 of the electric machine 18 such that the armature 36 of the pilot PMG 16 generates electrical signals (converted to DC current by a voltage regulator 38 of the electric generator system 10) that excite the DC field coils 26 of the electric machine 18.

A voltage regulator 38 is operatively connected between the pilot PMG 16 and the DC field coils 26 of the electric machine 18. Specifically, the voltage regulator 38 is operatively connected between the armature 36 of the pilot PMG 16 and the DC field coils 26 of the electric machine 18. The voltage regulator 38 is configured to regulate the output voltages of the main generator armature windings 28 (i.e., the AC armature coils 28) by continuously adjusting the DC current exciting the DC field coils 26 of the electric machine 18. Because the system 10 does not use an exciter, the voltage regulator 38 is directly connected to the DC field coils 26 of the wound field flux-switching electric machine 18. The voltage regulator 38 therefore may need to be more powerful than the voltage regulators of at least some known electric generator systems, for example as compared to the voltage regulators of electric generator systems that use wound field synchronous rotating electric machines (not shown).

As briefly described above, the electrical machine 18 is a wound field flux-switching electric machine 18. As used herein, a "wound field flux-switching electric machine" is defined as an electric machine where all of the active windings of the electric machine are located on the stator of the electric machine. In other words, a "wound field flux-switching electric machine" does not include any active windings on the rotor of the electric machine (such that the rotor is a passive rotor). The rotor 22 of the electric machine 18 may be a toothed rotor or a segmented rotor. The DC field coils 26 may or may not overlap the AC armature coils 28. In other words, the DC field coils 26 may be interleaved between the AC armature coils 28 in an overlapping manner or the DC field coils 26 and the AC armature coils 28 may be concentrated windings that do not overlap. Various examples of embodiments of the wound field flux-switching electric machine 18 are described and illustrated below.

In the illustrated embodiment of FIG. 1, the stator 20 of the electric machine 18 extends around the rotor 22 such that the rotor 22 rotates inside the stator 20. Alternatively, the rotor 22 extends around the stator 20 such that the rotor 22 is configured to rotate around the stator 20. As can be seen in FIG. 1, in the illustrated embodiment the system 10 does not include a rotating rectifier (not shown) or a brush-less exciter (not shown).

Figure 2:
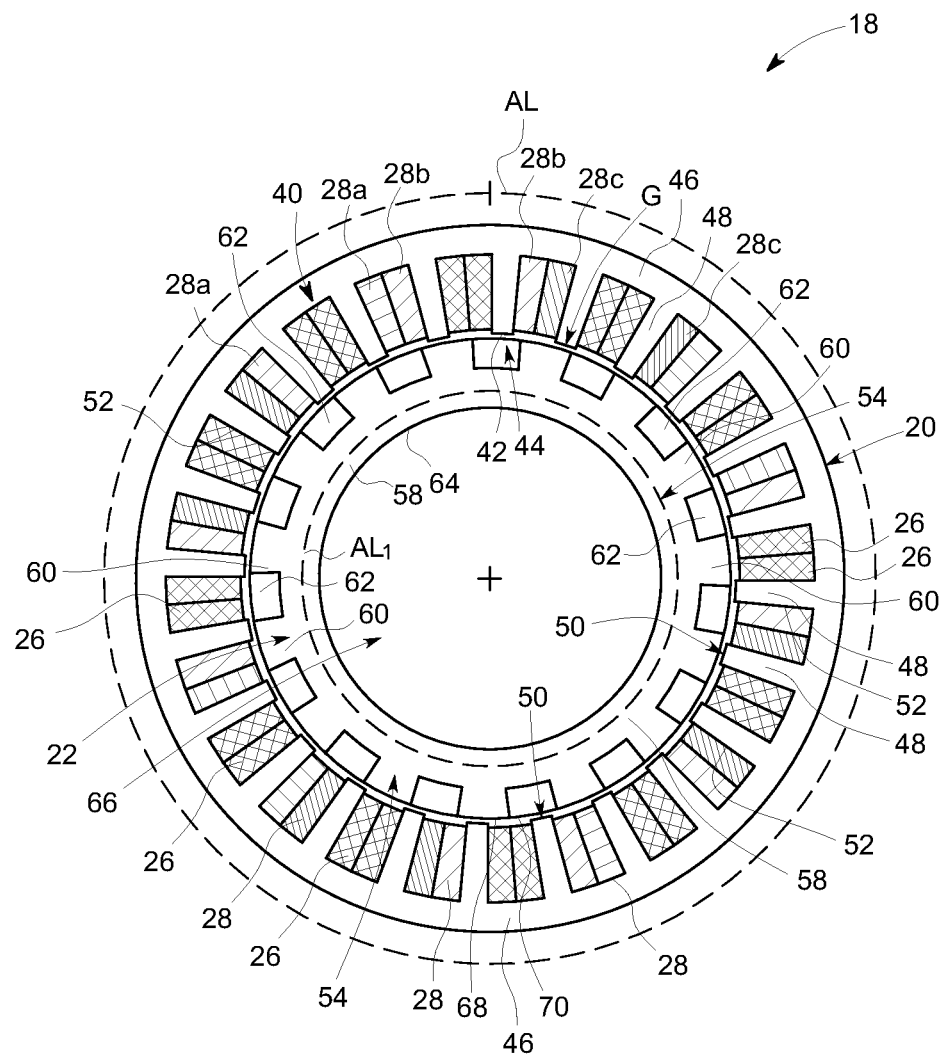
FIG. 2 is a cross-sectional view of an embodiment of a wound field flux-switching electric machine of the electric generator shown in FIG. 1.

FIG. 2 is a cross-sectional view of an embodiment of the electric machine 18. The stator 20 of the electric machine 18 includes a stator core 40, which generates a magnetic field. The stator core 40 extends an arc length AL. A radially (relative to the central longitudinal axis 14) inner surface 42 of the stator core 40 defines a central opening 44 of the stator core 40.

In the illustrated embodiment of the stator 20, the stator core 40 includes a stator base 46 and a plurality of stator teeth 48 that extend radially (relative to the central longitudinal axis 14) from the stator base 46. The stator teeth 48 extend radially from the stator base 46 to ends 50 of the stator teeth 48. In the illustrated embodiment of the stator 20, the stator teeth 48 extend radially (relative to the central longitudinal axis 14) inward from the stator base 46. As can be seen in FIG. 2, the stator teeth 48 are arranged radially about the central longitudinal axis 14 such that the stator teeth 48 are spaced apart from each other along the arc length AL of the stator core 40. The stator core 40 includes stator slots 52 that extend between adjacent stator teeth 48 along the arc length AL of the stator core 40. In other words, the stator slots 52 are arranged with the stator teeth 48 in an alternating pattern of stator teeth 48 and stator slots 52 along the arc length AL of the stator core 40. The stator slots 52 extend radially (relative to the central longitudinal axis 14) from the stator base 46. In the illustrated embodiment of the stator 20, the stator slots 52 extend radially (relative to the central longitudinal axis 14) inward from the stator base 46. In some alternative embodiments, the ends 50 of adjacent stator teeth 48 are connected together.

The stator 20 includes all of the active windings 24 of the electric machine 18. Specifically, the DC field coils 26 are wound around corresponding stator teeth 48 and the AC armature coils 28 are wound around corresponding stator teeth 48. The DC field coils 26 are interleaved between the AC armature coils 28 along the arc length AL of the stator core 40. Specifically, the DC field coils 26 and the AC armature coils 28 are arranged alternately along the arc length AL of the stator core 40. Optionally, the DC field coils 26 may overlap the AC armature coils 28 along the arc length AL of the stator core 40.

The AC armature coils 28 may be, or represent, any number of phases, such as, but not limited to, a single phase, three phases, six phases, and/or the like. In the illustrated embodiment of the electric machine 18, the AC armature coils 28 represent one or more sets of three-phase windings. Specifically, the AC armature coils 28 include first, second, and third phase AC armature coils 28a, 28b, and 28c, respectively. Each of the coils 26, 28a, 28b, and 28c is shown with a different cross-hatching in FIG. 2 for clarity.

The stator core 40 may include any number of stator teeth 48 and any number of stator slots 52. In the illustrated embodiment of the stator 20, the stator core 40 includes twenty four stator teeth 48 and twenty four stator slots 52. The stator core 40 may include any number of DC field coils 26 and any number of AC armature coils 28. When the stator 20 includes a plurality of phases of AC armature coils 28, the stator 20 may include any number of sets of the phases. For example, in the illustrated embodiment of the electric machine 18, the stator 20 includes four sets of three-phase windings, such that the stator 20 includes twelve AC armature coils 28.

The rotor 22 includes a rotor core 54. The rotor core 54 includes a body 56 that extends a length along the central longitudinal axis 14. The body 56 of the rotor core 54 extends an arc length $AL_1$. The body 56 is configured to rotate about the central longitudinal axis 14 relative to the stator 20. In the illustrated embodiment of the rotor 22, the body 56 includes a rotor base 58, a plurality of magnetic segments 60 that extend radially (relative to the central longitudinal axis 14) from the rotor base 58, and a plurality of non-magnetic segments 62 that extend radially (relative to the central longitudinal axis 14) from the rotor base 58. In the illustrated embodiment of the rotor 22, the segments 60 and 62 extend radially (relative to the central longitudinal axis 14) outward from the rotor base 58. The magnetic segments 60 and the non-magnetic segments 62 are arranged in an alternating pattern of magnetic segments 60 and non-magnetic segments 62 along the arc length $AL_1$ of the rotor core 54. In other words, the magnetic segments 60 are arranged radially about the central longitudinal axis 14 such that the magnetic segments 60 are spaced apart from each other along the arc length $AL_1$ of the rotor core 54, with the non-magnetic segments 62 extending between adjacent magnetic segments 60 along the arc length $AL_1$ of the rotor core 54. In the illustrated embodiment of the rotor 22, the rotor 22 is a toothed rotor wherein the magnetic segments 60 define rotor teeth 60 of the rotor core 54.

Figure 3:
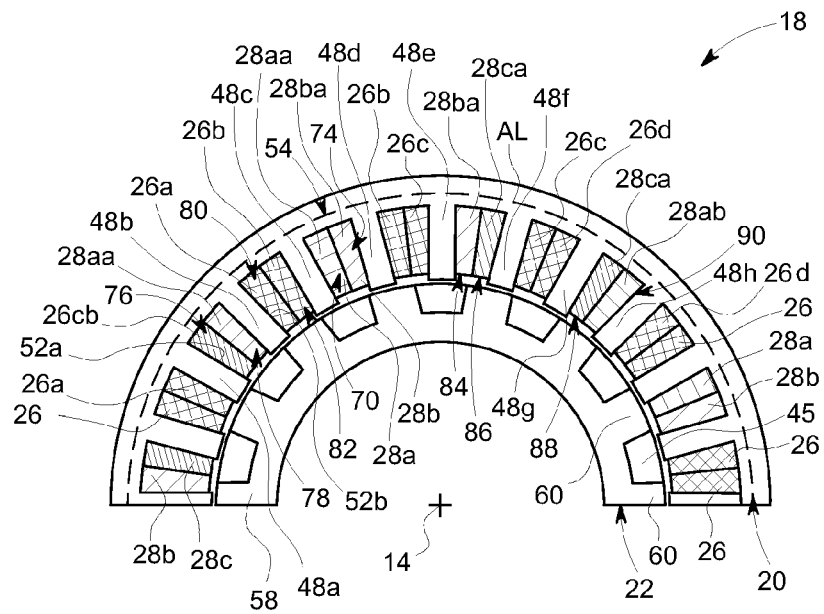
FIG. 3 is an enlarged cross-sectional view of a portion of the electric machine shown in FIG. 2.

The rotor base 58 of the rotor core body 56 includes a radially (relative to the central longitudinal axis 14) inner surface 64 that defines a central opening 66 of the rotor core 54. The rotor core 54 includes a circumference defined by end surfaces 68 and 70 of the magnetic and non-magnetic segments 60 and 62, respectively. As can be seen in FIG. 3, the circumference of the rotor core 54 has an approximately constant radius of curvature along the arc length $AL_1$ of the rotor core 54. In other words, the end surfaces 68 and 70 have approximately the same radius as each other and are concentrically aligned along the central longitudinal axis 14 such that the circumference of the rotor core 54 is approximately smooth along the arc length $AL_1$ of the rotor core 54. An air gap G extends between the circumference of the rotor core 54 and the radially inner surface 42 of the stator core 40. The rotor base 58 may include one or more mortices (not shown) that are configured to receive corresponding tenons (not shown) of the shaft 12 (FIG. 1) therein for mounting the rotor core body 56 to the shaft 12. Other arrangements for mounting the rotor core body 56 to the shaft 12 may be provided in addition or alternative to the mortices and tenons.

The body 56 of the rotor core 54 may be formed from one or more stacks of a plurality of laminations. As an alternative to using one or more stacks of laminations, the rotor core body 56 may be formed as a single piece of material. The rotor base 58 of the rotor core body 56 may be integrally formed with the magnetic segments 60 and/or the non-magnetic segments 62 from a magnetic material. For example, when the body 56 of the rotor core 54 is formed from a stack of laminations, the rotor base 58 of each lamination, or layer, within the stack may be integrally formed with the magnetic segments 60 and/or the non-magnetic segments 62 of the lamination from a magnetic material. Moreover, and for example, in embodiments wherein the rotor core body 56 is formed as a single piece of material, the rotor base 58 is a single piece of material that is integrally formed with all of the magnetic segments 60 and non-magnetic segments 62 of the rotor core 54 from a magnetic material. In the illustrated embodiment of the rotor 22, the magnetic segments magnetically communicate with the rotor base 58 such that the rotor 22 is a toothed rotor. In other words, the rotor base 58 carries magnetic flux.

The toothed rotor structure of the rotor 22, whether constructed of a stack of laminations or a single piece of material, distinguishes the rotor 22 from a "segmented" rotor 22 that includes a rotor core having magnetic segments that are magnetically isolated, or segmented, from the rotor base and each other. The stator 20 and/or the rotor 22 may or may not include a permanent magnet.

As will be described in more detail below, the magnetic segments 60 and the non-magnetic segments 62 may be integrally formed with each other from a magnetic material, with the non-magnetic segments 62 being rendered non-magnetic after being formed from the magnetic material. In other embodiments, and as will also be described below, the non-magnetic segments 62 are formed as discrete components relative to the magnetic segments 60.

The rotor core 54 may include any number of magnetic segments 60 and/or non-magnetic segments 62. For example, the rotor core 54 may include any number of rotor teeth 60. The rotor core 54 may include the same number of rotor teeth 60 as the number of stator teeth 48 that the stator core 40 includes. Alternatively, the stator core 40 may include a greater or a lesser number of stator teeth 48 than the number of rotor teeth 60 that the rotor core 54 includes. In the illustrated embodiment of the electric machine 18, the rotor core 54 includes fourteen rotor teeth 60, such that the illustrated embodiment of the electrical machine 18 includes a greater number of stator teeth 48 than rotor teeth 60.

Optionally, rotor windage loss is minimized by: (1) using a dual-phase magnetic material made of one single lamination in the rotor 22 (with the areas that need to be non-magnetic [e.g., the non-magnetic segments 62 and/or the like] being de-magnetized); and/or (2) providing inserts between adjacent magnetic segments 60 to provide the circumference of the rotor 22 as an approximately smooth surface along the arc length of the rotor 22.

In operation of the electric machine 18, the DC field coils 26 in combination with the rotation of the rotor 22 create a change in the magnetic flux of the electric machine 18. As the rotor core 54 rotates relative to the stator core 40, excitation of the DC field coils 26 causes the magnitude and/or direction (i.e., polarity or sign) of the magnetic flux to vary as the magnetic flux links to subsequent AC armature coils 28. The rotation of the rotor 22 relative to the stator 20 thus causes the magnetic flux to "switch" polarity in an alternative pattern, which according to Faraday's law causes an AC voltage induction in the AC armature coils 28 enabling energy conversion.

Figure 4:
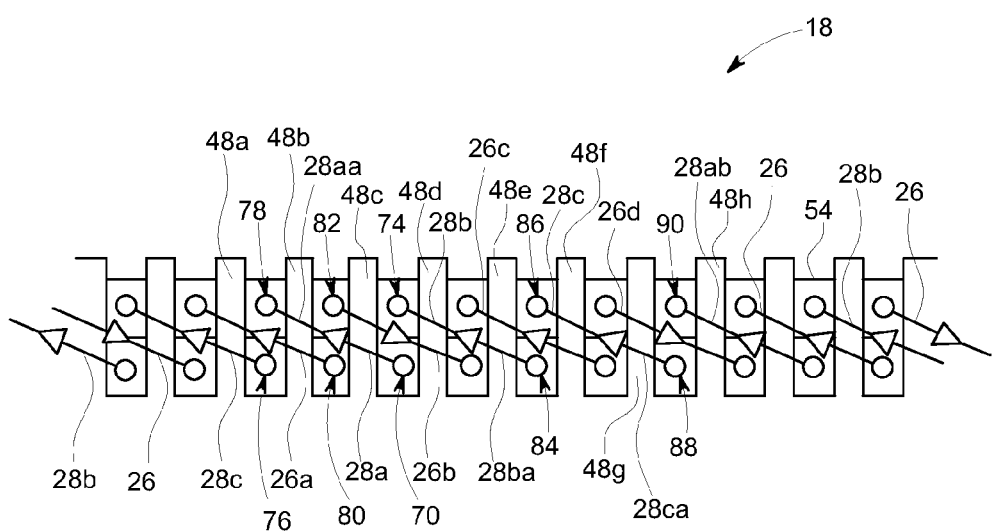
FIG. 4 is a schematic view of a portion of the electric machine shown in FIGS. 2 and 3 illustrating a pattern of exemplary embodiments of direct current (DC) field coils and alternating current (AC) armature coils of the electric machine shown in FIGS. 2 and 3.

FIG. 3 is an enlarged cross-sectional view of a portion of the electric machine 18. FIG. 4 is a schematic view of a portion of the electric machine 18 illustrating a pattern of the DC field coils 26 and the AC armature coils 28 along the arc length AL (not shown in FIG. 4) of the stator core 40. As briefly described above, within the pattern of the DC field coils 26 and the AC armature coils 28 along the arc length AL of the stator core 40, the DC field coils 26 may overlap the AC armature coils 28. For example, the DC field coils 26 include a DC field coil 26b and the AC armature coils 28 include AC armature coils 28aa and 28ba. In the illustrated embodiment of the electric machine 18, the coils 28aa and 28ba are of different phases. But, the coils 28aa and 28ba may be of the same phase in other embodiments. The AC armature coils 28aa and 28ba include respective ends 72 and 74 that oppose each other along the arc length AL of the stator core 40. As can be seen in FIGS. 3 and 4, the DC field coil 26b overlaps both the end 72 of the AC armature coil 28aa and the end 74 of the AC armature coil 28ba.

As described above, in the illustrated embodiment of the electric machine 18, the AC armature coils 28 include four sets of first, second, and third phase AC armature coils 28a, 28b, and 28c, respectively. Each of the coils 26, 28a, 28b, and 28c is shown with a different cross-hatching in FIG. 3 for clarity. Only two sets of the first, second, and third phase AC armature coils 28a, 28b, and 28c, respectively, are shown in FIGS. 3 and 4 for clarity. Moreover, only the pattern of the DC field coils 26 and one of the sets of the first, second, and third phase AC armature coils 28a, 28b, and 28c, respectively, will be specifically described with reference to FIGS. 3 and 4. It should be understood that the DC field coils 26 and the sets of the first, second, and third phase AC armature coils 28a, 28b, and 28c, respectively, that are not shown in FIGS. 3 and 4 have the same pattern as the pattern of the DC field coils 26 and the sets of the first, second, and third phase AC armature coils 28a, 28b, and 28c, respectively, that is shown in FIGS. 3 and 4 and described below.

As can be seen in FIGS. 3 and 4, the DC field coils 26 are interleaved between the first, second, and third phase AC armature coils 28a, 28b, and 28c, respectively, along the arc length AL of the stator core 54 in an overlapping manner with the first, second, and third phase AC armature coils 28a, 28b, and 28c, respectively. Specifically, the stator teeth 48 of the stator core 54 include stator teeth 48a, 48b, 48c, 48d, 48e, 48f, 48g, and 48h, which are consecutively arranged along the arc length AL of the stator core 40. In other words, the stator teeth 48a and 48b are positioned adjacent each other along the arc length AL of the stator core 40, stator teeth 48b and 48c are positioned adjacent each other, and so forth. The first phase AC armature coil 28aa is wound around the stator teeth 48b and 48c. The second phase AC armature coil 28ba is wrapped around the stator teeth 48d and 48e, while a third phase AC armature coil 28ca is wrapped around the stator teeth 48f and 48g. Although each AC armature coil 28 is shown as being wound around two corresponding stator teeth 48, each AC armature coil 28 may be wound around any number of corresponding stator teeth 48, for example to provide a predetermined amount of overlap of a DC field coil 26 and an AC armature coil 28.

A DC field coil 26a is wound around the stator teeth 48a and 48b. The DC field coil 26a overlaps an end 76 of a third phase AC armature coil 28cb and overlaps an end 78 of the first phase AC armature coil 28aa along the arc length AL of the stator core 40. As can be seen in FIG. 3, the end 76 of the third phase AC armature coil 28cb extends within the same stator slot 52a as the end 78 of the first phase AC armature coil 28aa. The ends 76 and 78 oppose each other within the stator slot 52a.

The DC field coil 26b is wound around the stator teeth 48c and 48d. The DC field coil 26b overlaps the end 72 of the first phase AC armature coil 28aa along the arc length AL of the stator core 40. The DC field coil 26b also overlaps the end 74 of the second phase AC armature coil 28ba along the arc length AL of the stator core 40. As can be seen in FIG. 3, an end 80 of the DC field coil 26a extends within the same stator slot 52b as an end 82 of the DC field coil 26b. The ends 80 and 82 oppose each other within the stator slot 52b.

A DC field coil 26c is wound around the stator teeth 48e and 48f. The DC field coil 26c overlaps an end 84 of the second phase AC armature coil 26ba along the arc length AL of the stator core 40. The DC field coil 26c also overlaps an end 86 of a third phase AC armature coil 236ca along the arc length AL of the stator core 40. A DC field coil 26d is wound around the stator teeth 48g and 48h. The DC field coil 26d overlaps an end 88 of the third phase AC armature coil 26ca along the arc length AL of the stator core 40. The DC field coil

26d also overlaps an end 90 of a first phase AC armature coil 26ab along the arc length AL of the stator core 40.

Although each DC field coil 26 is shown as being wound around two corresponding stator teeth 48, each DC field coil 26 may be wound around any number of corresponding stator teeth 48, for example to provide a predetermined amount of overlap of a DC field coil 26 and an AC armature coil 28. Each DC field coil 26 may overlap the corresponding AC armature coil(s) 26 by any amount, which may be selected to provide the electric machine 18 with one or more electrical and/or mechanical properties.

Referring now solely to FIG. 3, in the illustrated embodiment of the rotor 22, the magnetic segments 60 and the non-magnetic segments 62 are integrally formed with each other and the rotor base 58 from a magnetic material. The non-magnetic segments 62 are then rendered non-magnetic after being formed from the magnetic material to form the pattern of magnetic and non-magnetic segments 60 and 62, respectively. Once the non-magnetic segments 62 have been rendered non-magnetic, the material of the rotor core 54 may be referred to as a "bi-state material". The non-magnetic segments 62 may be rendered non-magnetic using any method, means, process, structure, and/or the like, such as, but not limited to, using a laser and/or the like. In some alternative embodiments, the magnetic segments 60 and the non-magnetic segments 62 are integrally formed with each other and the rotor base 58 from a non-magnetic material, with the magnetic segments 60 (and optionally the rotor base 58, for example if the rotor is a toothed rotor) being magnetized thereafter.

Figure 5:
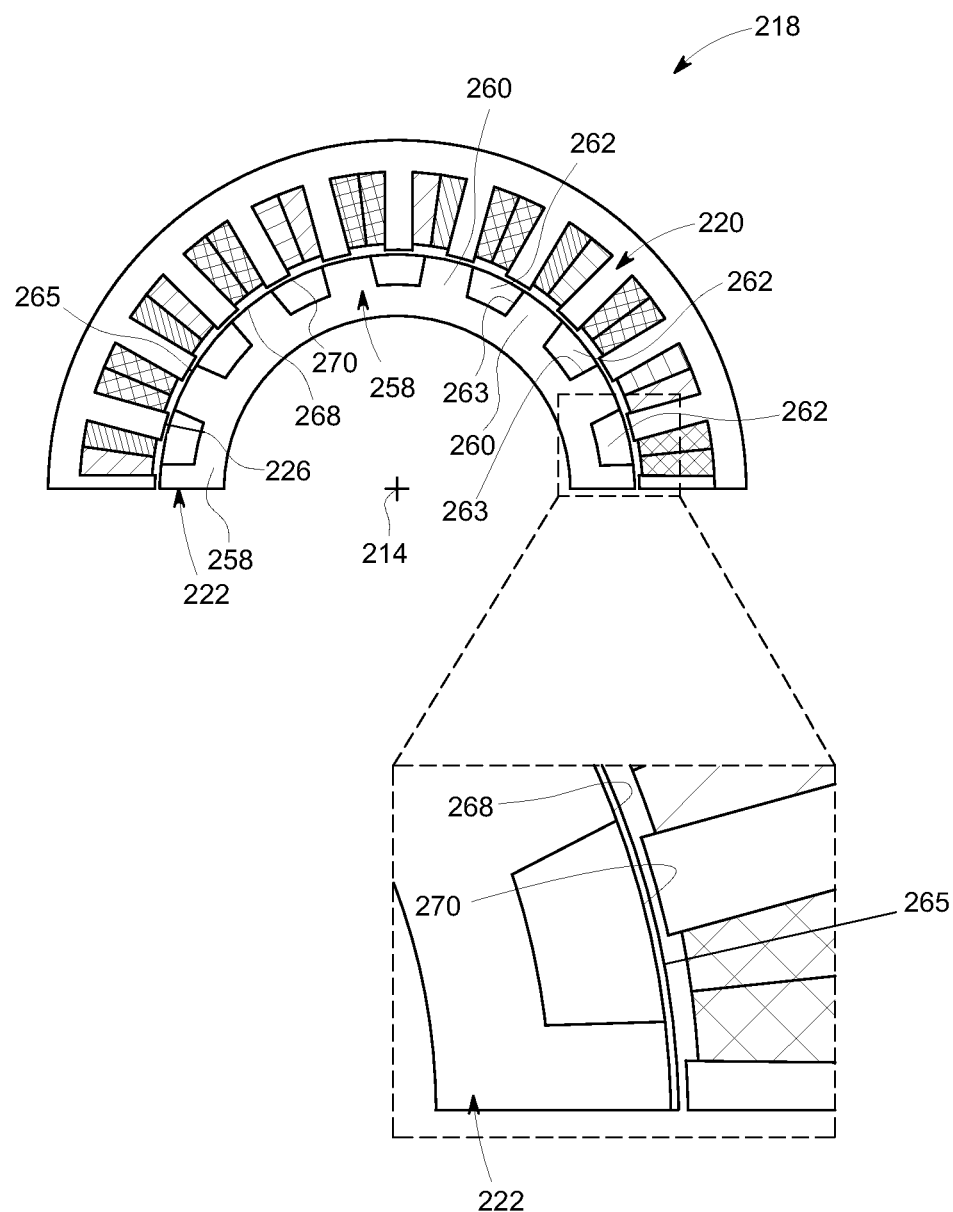
FIG. 5 is an enlarged cross-sectional view of a portion of another embodiment of a wound field flux-switching electric machine.

As described above, instead of forming a bi-state material, the non-magnetic segments 62 may be formed as discrete components relative to the magnetic segments 60. FIG. 5 is an enlarged cross-sectional view of a portion of another embodiment of a wound field flux-switching electric machine 218. The electric machine 218 includes a stator 220 and a rotor 222. The rotor 222 includes a rotor base 258, a plurality of magnetic segments 260 that extend radially (relative to a central longitudinal axis 214) from the rotor base 258, and a plurality of non-magnetic segments 262 that extend radially (relative to the central longitudinal axis 214) from the rotor base 258. The magnetic segments 260 and the non-magnetic segments 262 are arranged in an alternating pattern of magnetic segments 260 and non-magnetic segments 262 along an arc length of the rotor 222. In the illustrated embodiment of the rotor 222, the rotor 222 is a toothed rotor wherein the magnetic segments 260 define rotor teeth 260 of the rotor 222.

The non-magnetic segments 262 are formed as discrete components relative to the magnetic segments 260. For example, the rotor 222 includes rotor slots 263 that extend between adjacent magnetic segments 260 along the arc length of the rotor 222. The rotor slots 263 are arranged with the magnetic segments 260 in an alternating pattern of magnetic segments 260 and rotor slots 263 along the arc length of the rotor 222. The rotor slots 263 extend radially (relative to the central longitudinal axis 214) from the rotor base 258. In the illustrated embodiment of the rotor 222, the rotor slots 263 extend radially (relative to the central longitudinal axis 214) outward from the rotor base 258. The non-magnetic segments 262 are filler material that fill the rotor slots 263. In other words, the non-magnetic segments 262 extend within the rotor slots 263 and fill the spaces defined by the rotor slots 263 between adjacent magnetic segments 260. The filler material used to form the non-magnetic segments 262 may be any non-magnetic material.

The rotor 222 includes a circumference defined by end surfaces 268 and 270 of the magnetic and non-magnetic segments 260 and 262, respectively. As can be seen in FIG. 5, the circumference of the rotor 222 has an approximately constant radius of curvature along the arc length of the rotor 222 such that the circumference is approximately smooth along the arc length of the rotor 222.

Optionally, a rotor sleeve 265 extends around the circumference of the rotor 222. The rotor sleeve 265 may facilitate holding the filler material of the non-magnetic segments 262 within the rotor slots 263. As should be apparent from FIG. 5, the rotor sleeve 265 may provide the rotor 222 with an approximately smooth circumference along the arc length of the rotor 222. In some embodiments that include the rotor sleeve 265, the filler material used to form the non-magnetic segments 262 is air and/or another fluid.

The rotor sleeve 265 may be non-magnetic, non-electrically conductive, or may have a reduced electrical conductivity as compared to other components of the rotor 222. When the rotor sleeve 265 is included, an air gap may be defined between the rotor sleeve 265 and a radially inner surface 226 of the stator 220. When the rotor sleeve 253 is not included, an air gap may extend between the circumference of the rotor core 224 and a radially inner surface 226 of the stator 220.

Figure 6:
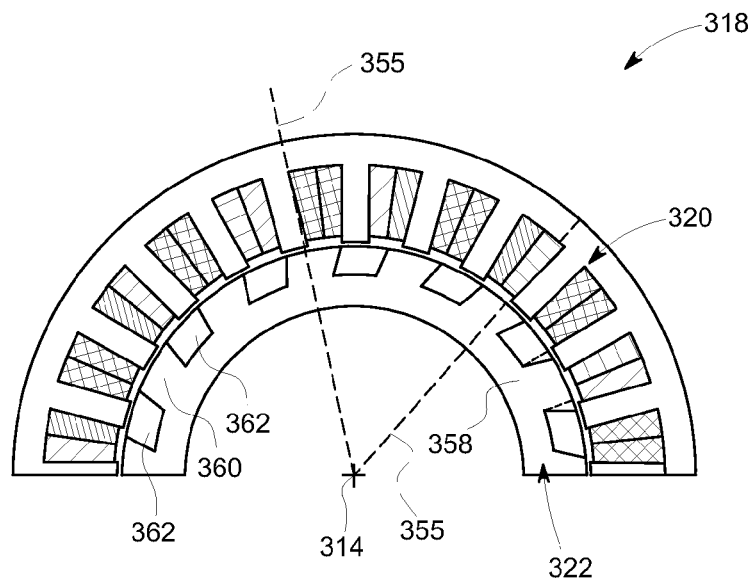
FIG. 6 is an enlarged cross-sectional view of a portion of another embodiment of a wound field flux-switching electrical machine.

FIG. 6 is an enlarged cross-sectional view of a portion of another embodiment of a wound field flux-switching electric machine 318. The electric machine 318 includes a stator 320 and a rotor 322. The rotor 322 includes a rotor base 358, a plurality of magnetic segments 360 that extend radially (relative to a central longitudinal axis 314) from the rotor base 358, and a plurality of non-magnetic segments 362 that extend radially (relative to the central longitudinal axis 314) from the rotor base 358. The magnetic segments 360 and the non-magnetic segments 362 are arranged in an alternating pattern of magnetic segments 360 and non-magnetic segments 362 along an arc length of the rotor 322. In the illustrated embodiment of the rotor 322, the rotor 322 is a toothed rotor wherein the magnetic segments 362 define rotor teeth 362 of the rotor 322.

The magnetic segments 360 extend radially relative to the central longitudinal axis 314 along central radial axes 355 that intersect the central longitudinal axis 314. Only two of the central radial axes 355 have been drawn in FIG. 6 for clarity. As can be seen in FIG. 6, each magnetic segment 360 has a shape that is asymmetrical about the corresponding central radial axis 355. Each magnetic segment 360 may have any shape that is asymmetrical about the corresponding central radial axis 355. The asymmetrical shapes about the central axes 355 may be selected to provide a rotor pole shape that increases output torque of the electric machine 318 under load conditions.

Figure 7:
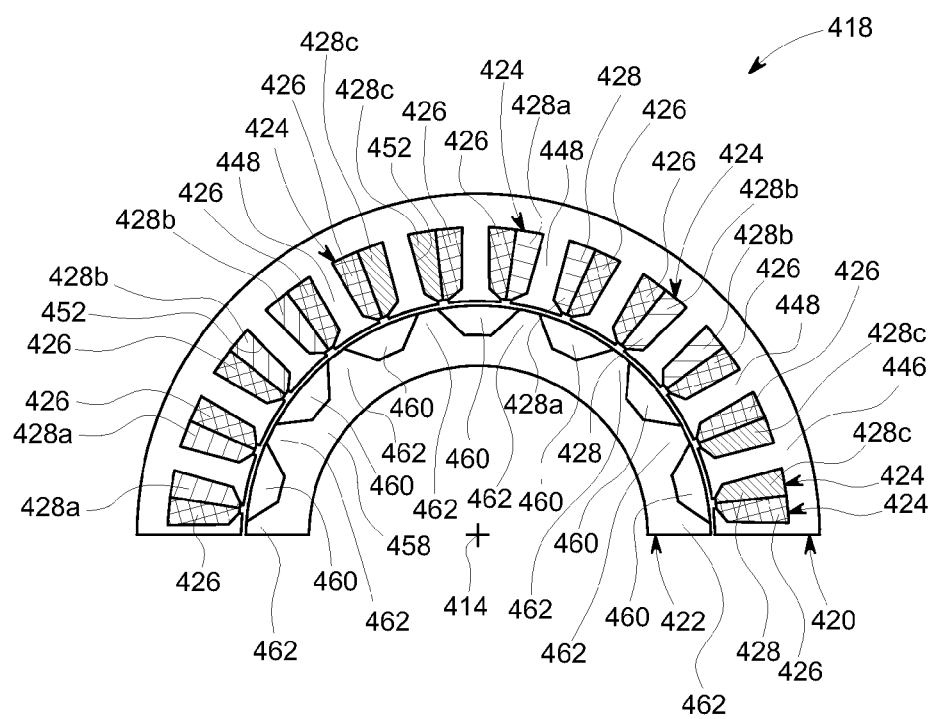
FIG. 7 is an enlarged cross-sectional view of a portion of another embodiment of a wound field flux-switching electrical machine.

FIG. 7 is an enlarged cross-sectional view of a portion of another embodiment of a wound field flux-switching electric machine 418. FIG. 7 illustrates a segmented rotor 422. The electric machine 418 includes a stator 420 and the rotor 422. The stator 420 includes a stator base 446 and stator teeth 448 that extend radially (relative to a central longitudinal axis 414) from the stator base 446. The stator 420 includes stator slots 452 that extend between adjacent stator teeth 448 along an arc length of the stator 420.

The stator 420 includes active windings 424 that include both DC field coils 426 wound around corresponding stator teeth 448 and AC armature coils 428 wound around corresponding stator teeth 448. The AC armature coils 428 may be, or represent, any number of phases, such as, but not limited to, a single phase, three phases, six phases, and/or the like. In the illustrated embodiment of the electric machine 418, the AC armature coils 428 include first, second, and third phase AC armature coils 428a, 428b, and 428c, respectively. Each of the coils 426, 428*a*, 428*b*, and 428*c* is shown with a different cross-hatching in FIG. 7 for clarity.

As can be seen in FIG. 7, the DC field coils 426 are interleaved (i.e., arranged alternately) between the AC armature coils 428 along the arc length of the stator 420. FIG. 7 illustrates an embodiment wherein the DC field coils 426 do not overlap the AC armature coils 428 along the arc length of the stator 420. Rather, FIG. 7 illustrates the active windings 424 of the electric machine 418 as concentrated windings where the DC field coils 426 do not overlap the AC armature coils 428.

The rotor 422 includes a rotor base 458, a plurality of magnetic segments 460 that extend radially (relative to a central longitudinal axis 414) from the rotor base 458, and a plurality of non-magnetic segments 462 that extend radially (relative to the central longitudinal axis 414) from the rotor base 458. The magnetic segments 460 and the non-magnetic segments 462 are arranged in an alternating pattern of magnetic segments 460 and non-magnetic segments 462 along an arc length of the rotor 422.

In the illustrated embodiment of the rotor 422, the rotor 422 is a segmented rotor 422 having a segmented rotor core. Specifically, the magnetic segments 460 are magnetically isolated, or segmented, from the rotor base 458 and each other. In other words, the rotor base 458 does not carry magnetic flux.

The rotor 422 may be formed from one or more stacks of a plurality of laminations. As an alternative to using one or more stacks of laminations, the rotor 422 may be formed as a single piece of material. The rotor base 458 may be integrally formed with the magnetic segments 460 and/or the non-magnetic segments 462 from a magnetic material. For example, when the rotor 422 is formed from a stack of laminations, the rotor base 458 of each lamination, or layer, within the stack may be integrally formed with the magnetic segments 460 and/or the non-magnetic segments 462 of the lamination from a magnetic material. Moreover, and for example, in embodiments wherein the rotor 422 is formed as a single piece of material, the rotor base 458 is a single piece of material that is integrally formed with all of the magnetic segments 460 and non-magnetic segments 462 of the rotor 422 from a magnetic material. The stator 420 and/or the rotor 422 may or may not include a permanent magnet.

In the illustrated embodiment of the rotor 422, the magnetic segments 460 and the non-magnetic segments 462 are integrally formed with each other and the rotor base 458 from a dual-phase magnetic material. The non-magnetic segments 462 and the rotor base 458 are then rendered non-magnetic after being formed from the magnetic material. Once the non-magnetic segments 462 and the rotor base 458 have been rendered non-magnetic, the material of the rotor 422 may be referred to as a "bi-state material". The non-magnetic segments 462 and the rotor base 458 may be rendered non-magnetic using any method, means, process, structure, and/or the like, such as, but not limited to, using a laser and/or the like.

Figure 8:
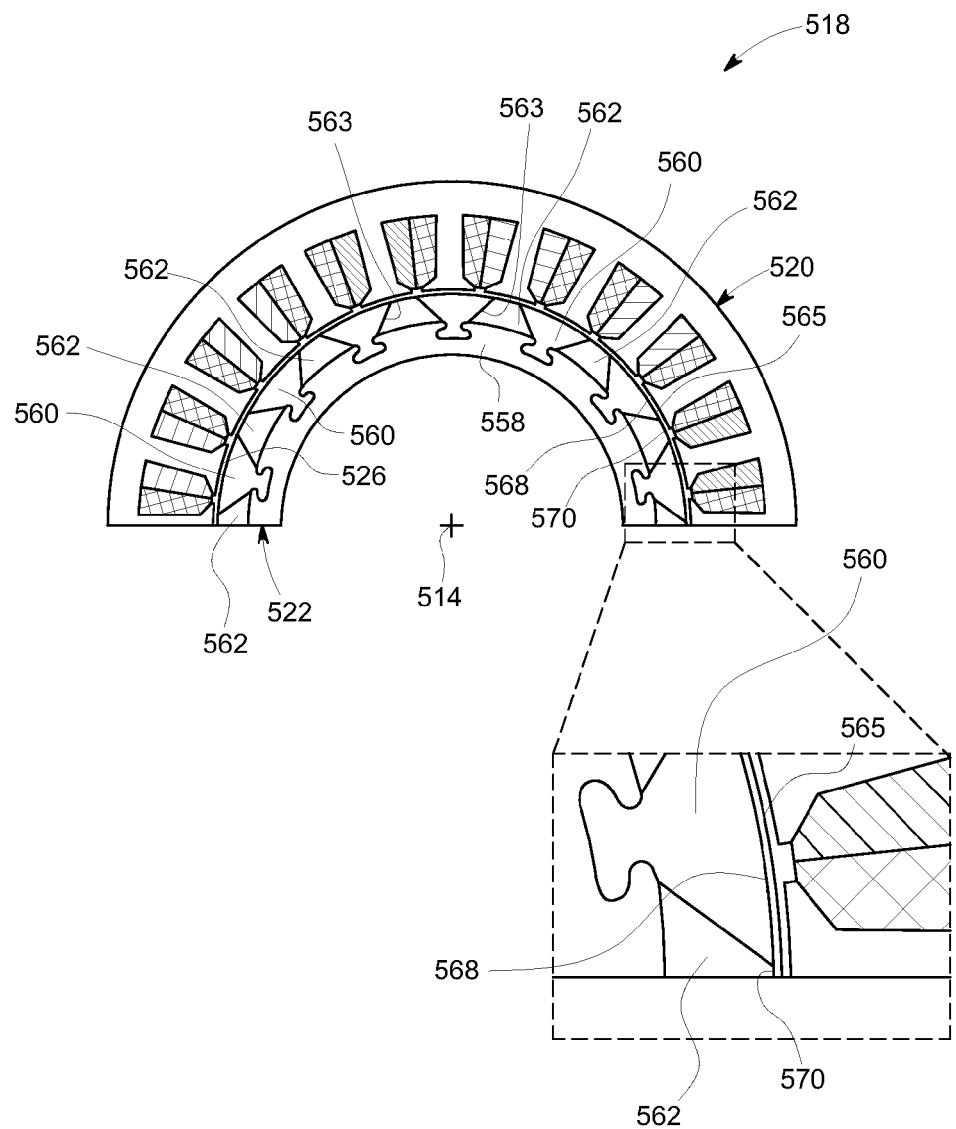
FIG. 8 is an enlarged cross-sectional view of a portion of another embodiment of a wound field flux-switching electrical machine.

FIG. 8 is an enlarged cross-sectional view of a portion of another embodiment of a wound field flux-switching electric machine 518. The electric machine 518 includes a stator 520 and a rotor 522. The rotor 522 includes a rotor base 558, a plurality of magnetic segments 560 that extend radially (relative to a central longitudinal axis 514) from the rotor base 558, and a plurality of non-magnetic segments 562 that extend radially (relative to the central longitudinal axis 514) from the rotor base 558. The magnetic segments 560 and the non-magnetic segments 562 are arranged in an alternating pattern of magnetic segments 560 and non-magnetic segments 562 along an arc length of the rotor 522. In the illustrated embodiment of the rotor 522, the rotor 522 is a segmented rotor wherein the magnetic segments 560 are magnetically isolated from the rotor base 558 and each other.

The non-magnetic segments 562 are formed as discrete components relative to the magnetic segments 560. For example, the rotor 522 includes rotor slots 563 that extend between adjacent magnetic segments 560 along the arc length of the rotor 522. The rotor slots 563 are arranged with the magnetic segments 560 in an alternating pattern of magnetic segments 560 and rotor slots 563 along the arc length of the rotor 522. The rotor slots 563 extend radially (relative to the central longitudinal axis 514) from the rotor base 558. In the illustrated embodiment of the rotor 522, the rotor slots 563 extend radially (relative to the central longitudinal axis 514) outward from the rotor base 558. The non-magnetic segments 562 are filler material that fill the rotor slots 563. In other words, the non-magnetic segments 562 extend within the rotor slots 563 and fill the spaces defined by the rotor slots 563 between adjacent magnetic segments 560. The filler material used to form the non-magnetic segments 562 may be any non-magnetic and non-electrically conductive material.

The rotor 522 includes a circumference defined by end surfaces 568 and 570 of the magnetic and non-magnetic segments 560 and 562, respectively. As can be seen in FIG. 8, the circumference of the rotor 522 has an approximately constant radius of curvature along the arc length of the rotor 522 such that the circumference is approximately smooth along the arc length of the rotor 522.

Optionally, a rotor sleeve 565 extends around the circumference of the rotor 522. The rotor sleeve 565 may facilitate holding the filler material of the non-magnetic segments 562 within the rotor slots 563. The rotor sleeve 565 may provide the rotor 522 with an approximately smooth circumference along the arc length of the rotor 522.

The rotor sleeve 565 may be non-magnetic, non-electrically conductive, or may have a reduced electrical conductivity as compared to other components of the rotor 522. When the rotor sleeve 565 is included, an air gap may be defined between the rotor sleeve 565 and a radially inner surface 526 of the stator 520. When the rotor sleeve 565 is not included, an air gap may extend between the circumference of the rotor 522 and the radially inner surface 526 of the stator 520.

Figure 9:
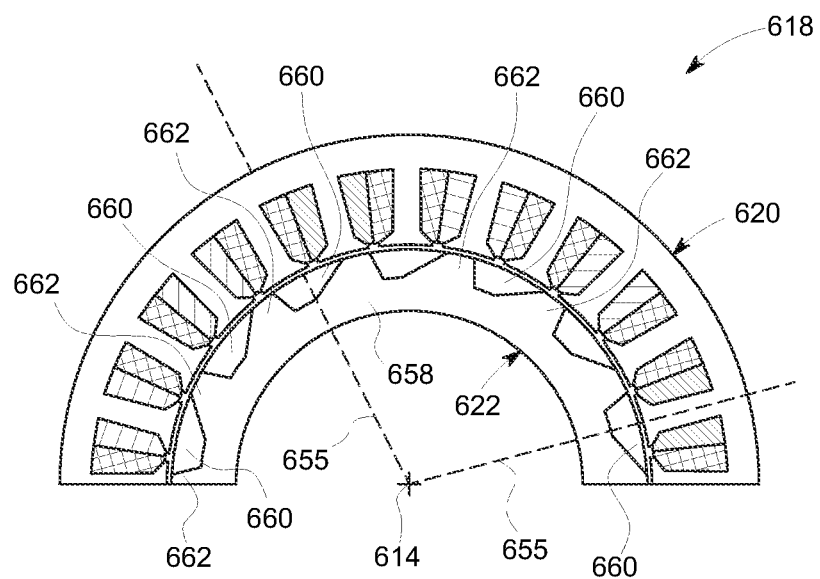
FIG. 9 is an enlarged cross-sectional view of a portion of another embodiment of a wound field flux-switching electrical machine.

FIG. 9 is an enlarged cross-sectional view of a portion of another embodiment of a wound field flux-switching electric machine 618. The electric machine 618 includes a stator 620 and a rotor 622. The rotor 622 includes a rotor base 658, a plurality of magnetic segments 660 that extend radially (relative to a central longitudinal axis 614) from the rotor base 658, and a plurality of non-magnetic segments 662 that extend radially (relative to the central longitudinal axis 614) from the rotor base 658. The magnetic segments 660 and the non-magnetic segments 662 are arranged in an alternating pattern of magnetic segments 660 and non-magnetic segments 662 along an arc length of the rotor 622. In the illustrated embodiment of the rotor 622, the rotor 622 is a segmented rotor wherein the magnetic segments 660 are magnetically isolated from the rotor base 658 and each other.

The magnetic segments 660 extend radially relative to the central longitudinal axis 614 along central radial axes 655 that intersect the central longitudinal axis 614. Only two of the central radial axes 655 have been drawn in FIG. 9 for clarity. As can be seen in FIG. 9, each magnetic segment 660 has a shape that is asymmetrical about the corresponding central radial axis 655. Each magnetic segment 660 may have any shape that is asymmetrical about the corresponding central radial axis 655. The asymmetrical shapes about the central axes 655 may be selected to provide a rotor pole shape that increases output torque of the electric machine 618 under load conditions.

Figure 10:
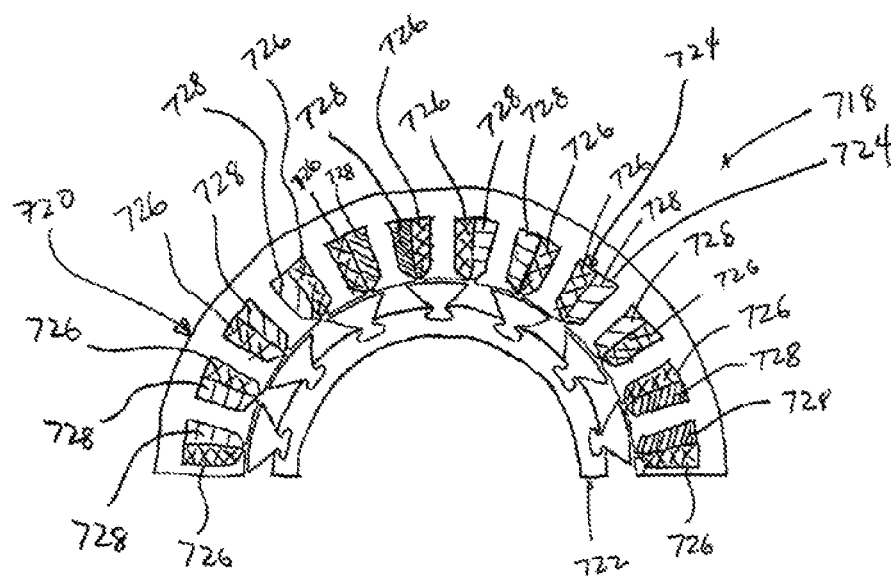
FIG. 10 is an enlarged cross-sectional view of a portion of another embodiment of a wound field flux-switching electrical machine.

FIG. 10 is an enlarged cross-sectional view of a portion of another embodiment of a wound field flux-switching electric machine 718. The electric machine 718 includes a stator 720 and a rotor 722. The stator 720 includes the active windings 724 of the electric machine 718, which include DC field coils 726 and the AC armature coils 728. As can be seen in FIG. 10, the DC field coils 726 are interleaved (i.e., arranged alternately) between the AC armature coils 728 along an arc length of the stator 720. FIG. 10 illustrates an embodiment wherein the DC field coils 726 do not overlap the AC armature coils 728 along the arc length of the stator 720. Rather, FIG. 10 illustrates the active windings 724 of the electric machine 718 as concentrated windings where the DC field coils 726 do not overlap the AC armature coils 728.

The AC armature coils 728 may be, or represent, any number of phases, such as, but not limited to, a single phase, three phases, six phases, and/or the like. In the illustrated embodiment of the electric machine 718, the AC armature coils 728 represent one or more sets of three-phase windings.

Figure 11:
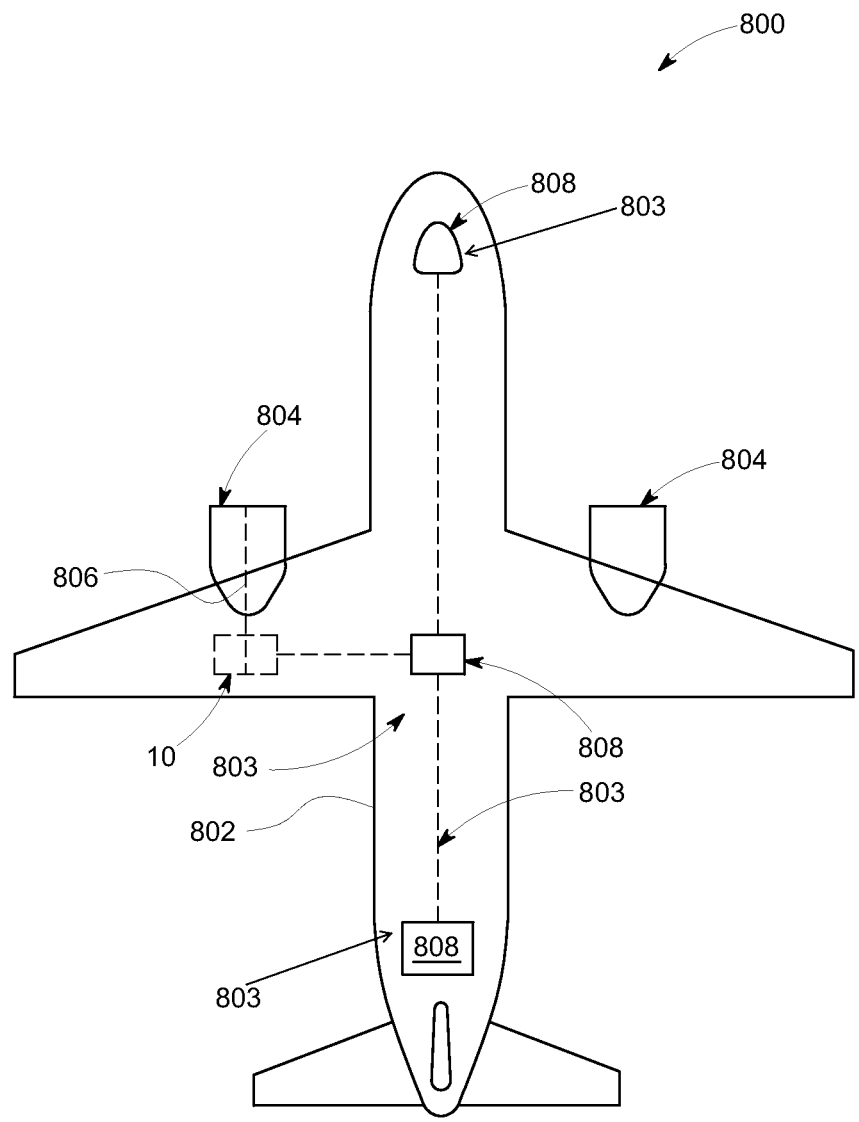
FIG. 11 is a schematic illustration of an embodiment of an aircraft.

As described above, the electric generator system 10 (FIG. 1) may be used to generate electrical power in any application such as, but are not limited to, automotive applications, aerospace applications, marine applications, industrial applications, and/or the like. FIG. 11 is a schematic illustration of an embodiment of an aircraft 800 that includes the electric generator system 10. In the illustrated embodiment, the aircraft 800 is a fixed wing passenger airplane, but the aircraft 800 may be any other type of aircraft.

The aircraft 800 includes an airframe 802, one or more engines 804, an electrical system 803, and the electric generator system 10. The engine(s) 804, the electrical system 803, and the electric generator system 10 are each located on-board the airframe 802 such that the engine(s) 804, the electrical system 803, and the electric generator system 10 are carried by the airframe 802 during flight of the aircraft 800. Each engine 804 includes a rotatable shaft 806 that is configured to rotate about a central longitudinal axis of the shaft. Each engine 804 may be any type of engine, such as, but not limited to, a turbine engine, an engine that drives a propeller or other rotor, a radial engine, a piston engine, a turboprop engine, a turbofan engine, and/or the like. Although two are shown, the aircraft 800 may include any number of the engines 804. Although shown located on wings of the airframe 802, each engine 804 may have any other location along the airframe 802.

The electrical system includes a plurality of electrical components 808 positioned at various locations along the airframe 802. Each electrical component 808 may be any type of electrical component that consumes electrical power to operate. As can be seen in FIG. 11, the electric generator system 10 is operatively connected to the shaft 806 of one or more of the engines 804. The system 10 may be configured to be used as a motor that starts operation of the engine 804. The system 10 may be configured to be used as an electric generator that supplies electrical power to the electrical system 803 during operation of the engine 804. Although only one is shown, the aircraft 800 may include any number of the system 10. For example, the other engine 804 may include an electric generator system 10 operatively connected thereto. Although shown located within a wing of the airframe 802, the system 10 may have any other location along the airframe 802.

Figure 12:
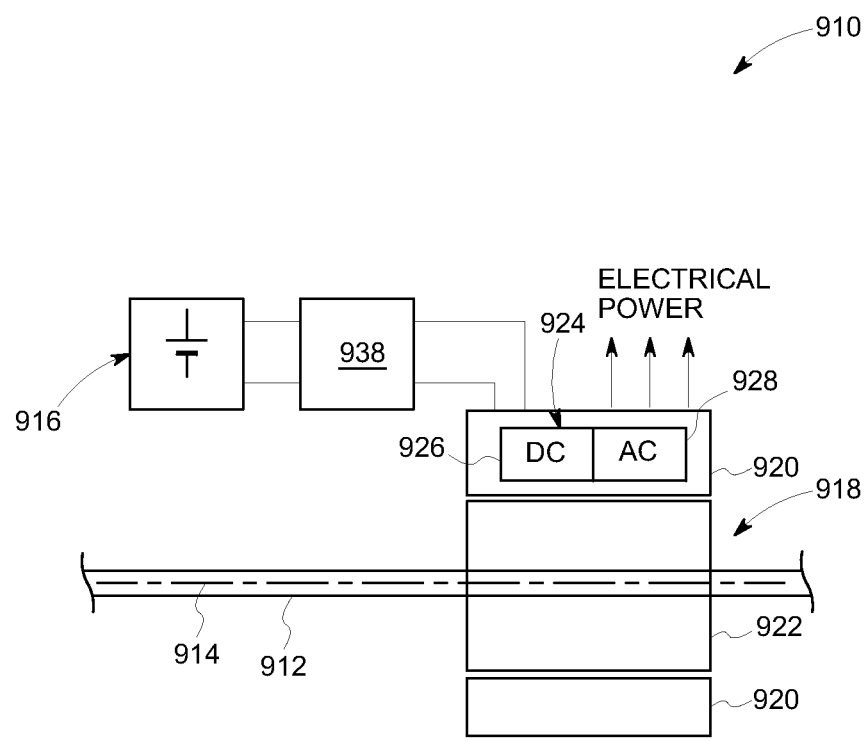
FIG. 12 is a schematic view of another embodiment of an electric generator system.

FIG. 12 is a schematic view of another embodiment of an electric generator system 910. The electric generator system 910 may be used to generate electrical power in any application such as, but are not limited to, automotive applications, aerospace applications, marine applications, industrial applications, and/or the like.

The system 910 includes a rotatable shaft 912 that extends a length along a central longitudinal axis 914. The shaft 912 is configured to rotate about the central longitudinal axis 914. The shaft 912 may be a shaft of another component of a larger system (e.g., an engine, an aircraft, and/or the like) that includes the system 910. For example, the shaft 912 may be an output shaft of an electric motor, a crankshaft of a combustion engine, a shaft of a gas turbine engine, and/or the like.

The system 910 includes a DC source 916 and a wound field flux-switching electric machine 918. The electric machine 918 includes a stator 920 and a rotor 922. The rotor 922 of the electric machine 918 is mounted to the shaft 912 such that the rotor 922 rotates about the central longitudinal axis 914 with the shaft 912. The electric machine 918 is an electric generator, wherein the relative rotation between the rotor 922 and the stator 920 converts mechanical energy to electrical energy. As will be described in more detail below, the stator 920 of the electric machine 918 includes all of the active windings 924 of the electric machine 918. Specifically, the stator 920 includes both DC field coils 926 and AC armature coils 28. The rotor 922 of the electric machine 918 may be a toothed rotor or a segmented rotor. The DC field coils 926 may or may not overlap the AC armature coils 928.

The DC source 916 is operatively connected to the DC field coils 926 of the electric machine 918 such that the DC source 916 is configured to excite the DC field coils 926. Specifically, the DC source 916 generates electrical signals (converted to DC current by a voltage regulator 938 of the electric generator system 910) that excite the DC field coils 926 of the electric machine 918.

The voltage regulator 938 is operatively connected between the DC source 916 and the DC field coils 926 of the electric machine 918. The voltage regulator 938 is configured to regulate the output voltages of the main generator armature windings 928 (i.e., the AC armature coils 928) by continuously adjusting the DC current exciting the DC field coils 926 of the electric machine 918. Because the system 910 does not use an exciter, the voltage regulator 938 is directly connected to the DC field coils 926 of the wound field flux-switching electric machine 918. The voltage regulator 938 therefore may need to be more powerful than the voltage regulators of at least some known electric generator systems, for example as compared to the voltage regulators of electric generator systems that use wound field synchronous rotating electric machines (not shown).

As should be understood from the above and FIG. 12, the electric generator system 910 uses only a single rotating electric machine. In the illustrated embodiment of FIG. 12, the stator 920 of the electric machine 918 extends around the rotor 922 such that the rotor 922 rotates inside the stator 920. Alternatively, the rotor 922 extends around the stator 920 such that the rotor 922 is configured to rotate around the stator 920. As can be seen in FIG. 12, in the illustrated embodiment the system 910 does not include a rotating rectifier (not shown) or a brush-less exciter (not shown).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. An electric generator system comprising:
    a rotatable shaft that is configured to rotate about a central longitudinal axis of the shaft;
    a pilot permanent magnet generator (PMG) mounted to the shaft such that the pilot PMG is configured to rotate about the central longitudinal axis with the shaft; and
    a wound field flux-switching electric machine comprising a rotor and a stator, the rotor being mounted to the shaft such that the rotor is configured to rotate about the central longitudinal axis with the shaft, the stator comprising both a direct current (DC) field coil and an alternating current (AC) armature coil, the DC field coil being operatively connected to the pilot PMG for exciting the DC field coil.

2. The system of claim 1, further comprising a voltage regulator operatively connected between the pilot PMG and the DC field coil.

3. The system of claim 1, wherein the DC field coil of the stator overlaps the AC armature coil of the stator along an arc length of the stator.

4. The system of claim 1, wherein the DC field coil comprises a plurality of DC field coils and the AC armature coil comprises a plurality of AC armature coils, and wherein the DC field coils do not overlap the AC armature coils along an arc length of the stator.

5. The system of claim 1, wherein the DC field coil comprises a plurality of DC field coils, the AC armature coil comprising first, second, and third phase AC armature coils representing a set of three-phase windings, the DC field coils being interleaved between the first, second, and third phase AC armature coils along an arc length of the stator in an overlapping manner with the first, second, and third phase AC armature coils.

6. The system of claim 1, wherein the rotor comprises a rotor base and rotor teeth that extend radially from the rotor base relative to the central longitudinal axis.

7. The system of claim 1, wherein the rotor is a segmented rotor.

8. The system of claim 1, wherein the system does not include a rotating rectifier.

9. The system of claim 1, wherein the system does not include a brush-less exciter.

10. The system of claim 1, wherein the stator comprises a stator base and stator teeth that extend radially from the stator base relative to the central longitudinal axis, the DC field coil being wound around at least one corresponding stator tooth, the AC armature coil being wound around at least one corresponding stator tooth.

11. An aircraft comprising:
    an airframe;
    an engine on-board the airframe, the engine comprising a rotatable shaft that is configured to rotate about a central longitudinal axis of the shaft; and
    an electric generator system on-board the airframe, the electric generator system comprising:
        a pilot permanent magnet generator (PMG) mounted to the shaft of the engine such that the pilot PMG is configured to rotate about the central longitudinal axis with the shaft; and
        a wound field flux-switching electric machine comprising a rotor and a stator, the rotor being mounted to the shaft of the engine such that the rotor is configured to rotate about the central longitudinal axis with the shaft, the stator comprising both a direct current (DC) field coil and an alternating current (AC) armature coil, the DC field coil being operatively connected to the pilot PMG for exciting the DC field coil.

12. The aircraft of claim 11, further comprising a voltage regulator operatively connected between the pilot PMG and the DC field coil.

13. The aircraft of claim 11, wherein the DC field coil of the stator overlaps the AC armature coil of the stator along an arc length of the stator.

14. The aircraft of claim 11, wherein the DC field coil comprises a plurality of DC field coils and the AC armature coil comprises a plurality of AC armature coils, and wherein the DC field coils do not overlap the AC armature coils along an arc length of the stator.

15. The aircraft of claim 11, wherein the rotor comprises a rotor base and rotor teeth that extend radially from the rotor base relative to the central longitudinal axis.

16. The aircraft of claim 11, wherein the rotor is a segmented rotor.

17. The aircraft of claim 11, wherein the electric generator system does not include a rotating rectifier.

18. The aircraft of claim 11, wherein the electric generator system does not include a brush-less exciter.

19. An electric generator system comprising:
    a rotatable shaft that is configured to rotate about a central longitudinal axis of the shaft;
    a direct current (DC) source; and
    a wound field flux-switching electric machine comprising a rotor and a stator, the rotor being mounted to the shaft such that the rotor is configured to rotate about the central longitudinal axis with the shaft, the stator comprising both a DC field coil and an alternating current (AC) armature coil, the DC field coil being operatively connected to the DC source for exciting the DC field coil.

20. The system of claim 19, wherein the system does not include any other rotating electric machines besides the wound field flux-switching electric machine.

* * * * *